US012633193B2

(12) United States Patent
Fong et al.

(10) Patent No.: US 12,633,193 B2
(45) Date of Patent: May 19, 2026

(54) MODULAR CASINO SERVICE PROCESSING DEVICES

(71) Applicant: Everi Payments Inc., Austin, TX (US)

(72) Inventors: Adam Fong, Henderson, NV (US); Justin Nelson, Mill Valley, CA (US); Ryan May, Las Vegas, NV (US)

(73) Assignee: Everi Payments, Inc., Austin, TX (US)

( * ) Notice: Subject to any disclaimer, the term of this patent is extended or adjusted under 35 U.S.C. 154(b) by 664 days.

(21) Appl. No.: 17/989,499

(22) Filed: Nov. 17, 2022

(65) Prior Publication Data

US 2023/0162554 A1 May 25, 2023

Related U.S. Application Data

(60) Provisional application No. 63/282,835, filed on Nov. 24, 2021.

(51) Int. Cl.
*G07F 17/32* (2006.01)
*G07D 11/40* (2019.01)

(52) U.S. Cl.
CPC ......... *G07F 17/3216* (2013.01); *G07D 11/40* (2019.01)

(58) Field of Classification Search
CPC ............. G07F 17/3216; G07F 17/3218; G07F 17/3202; G07F 17/322; G07D 11/40; G06Q 20/1085
USPC .......................................................... 235/379
See application file for complete search history.

(56) References Cited

U.S. PATENT DOCUMENTS

| | | | | |
|---|---|---|---|---|
| 5,113,990 | A * | 5/1992 | Gabrius | G07F 17/32 463/25 |
| 2005/0107167 | A1* | 5/2005 | Sasaki | G07F 17/3216 463/46 |
| 2011/0092283 | A1* | 4/2011 | Levitan | G07F 17/3216 463/31 |
| 2011/0183747 | A1* | 7/2011 | Cole | G07F 17/32 463/25 |
| 2015/0087401 | A1* | 3/2015 | Glenn, II | G07F 17/3211 463/25 |
| 2022/0301390 | A1* | 9/2022 | Villanueva | G02B 6/001 |

* cited by examiner

*Primary Examiner* — Suezu Ellis
(74) *Attorney, Agent, or Firm* — Sheridan Ross PC

(57) ABSTRACT

A modular service station providing customizable casino services has a base module which provides base functionality and/or one or more secondary modules which are associated with the base module and implement secondary functionality to the base functionality. Different secondary modules may be associated with the base module, including in different physical arrangements, to generate modular service stations having different functionality. The base module and secondary modules include physical connection to join them into a unitary structure and communication connections to join them functionally.

17 Claims, 3 Drawing Sheets

MODULAR CASINO SERVICE PROCESSING DEVICES

RELATED APPLICATION DATA

This application claims priority to U.S. Provisional Application Ser. No. 63/282,835, filed Nov. 24, 2021, which application is incorporated herein by reference in its entirety.

FIELD OF THE INVENTION

The present invention relates to casino financial processing and patron service equipment such as customer and attendant kiosks, cashier equipment and the like.

BACKGROUND OF THE INVENTION

A variety of configurations of service stations which are configured to facilitate services by or for casino personnel and patrons/players are well known. Casino service stations may include workstations used by casino attendants at a cashier's cage or service desk, or kiosks or other devices, such as for facilitating monetary transactions including jackpot payment, and other functions such as player verification or tracking, etc. (collectively "service stations"). Existing service stations have a number of drawbacks, however.

First, conventional casino workstations generally require a casino attendant to operate each station. As a result, a large number attendants are required at cashier's cages or service desks.

Second, there are numerous problems when considering the cost of manufacturing and developing service stations. Generally, each service station is specifically designed to implement one or more specific services. The service stations are generally constructed as a secure housing which contains or support the particular components which are necessary to implement the particular services. In addition, the circuitry for each service station is generally specific to the particular service station. For example, the configuration of the controller, wiring, and peripheral devices for a casino cashier workstation may vary greatly from the configuration of a jackpot processing kiosk.

These issues may require that a tremendous number of components be manufactured and assembled, in a variety of configurations, to create the variety of individual service stations. This can contribute to an increase amount of time for manufacturing, higher cost of parts inventory, and a higher cost of production. Further, because conventional service stations are assembled into a particular configuration, they may be large and thus not well-suited to being transported. Lastly, the creation of individual service stations with particular configurations may result in service stations which do not have the exact configuration of features which an operator desires. Casinos continue to implement new services for patrons. For example, new technology such as cashless payment methods and player loyalty systems require new devices, such as to facilitate player authentication/validation and player loyalty card dispensing. However, existing service stations may not support such functionality.

A solution to the problems listed above is desired.

SUMMARY OF THE INVENTION

Aspects of the invention comprise modular service stations, such as a modular casino service processing devices, and methods of assembling and using the same.

In one embodiment, a modular casino service station comprises a base module, where the base module comprises a housing, a controller located in the housing, at least one first connector associated with the housing, a first communication interface, the first communication interface in communication with the controller, and a secondary module, the secondary module comprising a housing, at least one second connector associated with the housing and configured to connect to the at least one first connector, and a second communication interface, the second communication interface configured to communicatively couple with the first communication interface, wherein the secondary module and the base module are selectively coupled by the at least one first connector and the at least one second connector so that the base module is adjacent to the secondary module, the second communication interface is communicatively coupled with the first communication interface, and wherein the base module and the secondary module comprise at least one of a currency dispenser module, a player loyalty interface module, a currency recycler module, a user interface module and a storage module.

Other embodiments comprise methods of creating modular casino stations, such as by selecting individual modules, such as a base module and at least one secondary module, and connecting the secondary module to the base module.

Further objects, features, and advantages of the present invention over the prior art will become apparent from the detailed description of the drawings which follows, when considered with the attached figures.

DETAILED DESCRIPTION OF THE INVENTION

Figure 1:
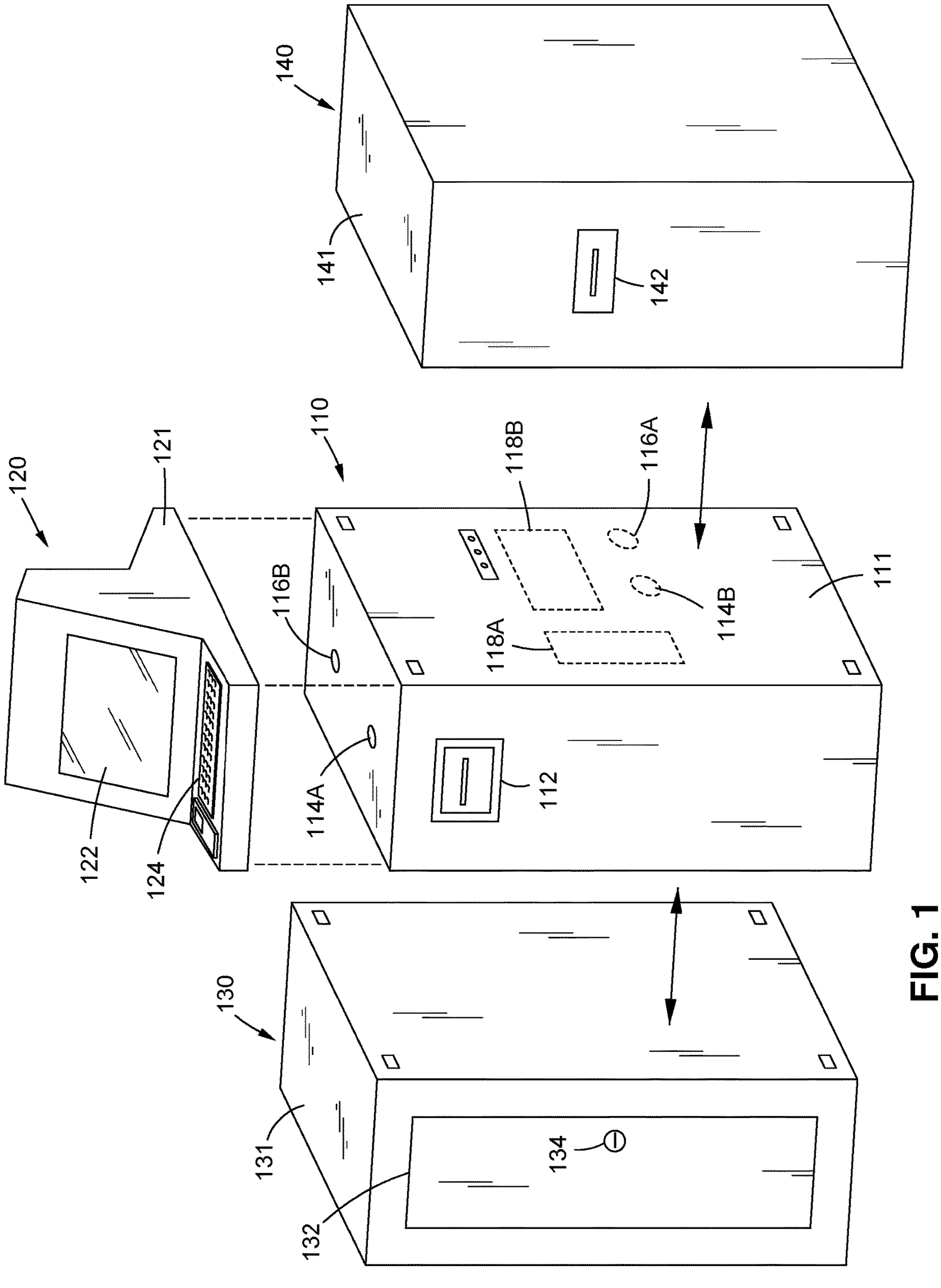
FIG. 1 is an exemplary embodiment of a modular service station in accordance with the invention.

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Embodiments of the invention comprise modular service stations, methods of assembly and methods of using modular service stations. In one embodiment, the modular service station comprises a modular casino services processing device, such as for facilitating financial processing, player loyalty or other services.

One aspect of the invention is a modular service station. The service station may be said to be "modular" in the sense that it comprises a number of individual components which may be selectively associated with one another (physically and/or functionally), to generate service stations of different configurations.

In one embodiment, the modular service station may comprise a base module which provides base functionality, or a base module and one or more secondary modules which may be selectively associated with the base module, such as to provide additional or modified functionality to the base module.

In one embodiment, the base module may comprise at least one internal controller located in a secure housing. The secure housing may comprise a universal modular service station interface ("universal interface"). Other aspects of the invention comprise methods of assembling a modular service station and methods of using and/or operating a modular service station, such as by associating one or more secondary modules with the base module.

Aspects of the modular service station will be described first with reference to FIG. 1. In this embodiment, the modular service station comprises a casino services processing station, such as for facilitating financial services or other services, such as player loyalty or other functionality.

In one embodiment, the modular service station comprises a base module 110. The base module 110 may be configured to implement or facilitate first or base casino services. The modular service station may further comprise one or more secondary modules which may be associated with the base module 110, such as by being attached to or detached from the base module 110. These secondary modules may be configured to provide or implement secondary functionality, such as one or second casino services or functions. Examples of such secondary modules comprise, but are not limited to, a user input module 120, a storage module 130, and a currency recycling module 140.

In one embodiment, the base module 110 may include housing 111, which may be a generally enclosed box or other enclosure. Portions of the housing 111 may be opened or removed to provide selective access to the interior thereof. The removable portions may be secured with one or more locks, such as a purely mechanical key-operated lock or an electro-mechanical lock, such as a card-reader, fob or other type lock.

In a preferred embodiment, the housing 111 of the base module 110 may be constructed of metal. The outside of each of the sides and components of the base module 110 may be painted, plated or the like, such as in a powder coat process in order to protect those components and improve the aesthetic appearance thereof.

The housing 111 may include a front, back, left (or first side), right (or second side), top, and bottom. Various interfaces may be provided in the housing 110. For example, when the base module 110 includes a currency dispensing device, the front surface may include a currency dispenser outlet 112 to which the currency dispenser may dispense currency (including but not limited to bills, coins, or tickets, tokens, or any other type of item representing a monetary value).

The base module 110 may comprise a communication interface 114, which may be configured to communicate and/or interface with external devices or systems, including other modules (discussed below), such as via wired communication (such as USB, HDMI, or any other type of cable or means for input/output). In one embodiment, the communication interface 114 may facilitate wireless communication with other modules. The communication interface 114 may also facilitate wired (such as via one or more cables) or wireless communication with user devices such as mobile phones, tablets, personal computers, etc. In the case of a wired or other physically connecting interface, the communication interface 114 may be located on any surface of the base module 110 (such as the back, left, right, or top surface).

In one embodiment, communication interfaces may be provided relative to each secondary module which is associated with the base module 110. For example, one or more communication interfaces are provided relative to the user input module 120 for electronic connection to the base module 110. In one embodiment, the communication interface may be male/female type electrical connectors or plugs, such as multi-pin connectors. The communication interfaces may be located at the ends of wiring runs, and those wiring runs may then be extended and plugged into one another during attachment of the modules (such as by extending them through openings in the modules). In another embodiment, the communication interfaces could be mounted in stationary locations which, when mating portions of the modules are connected, cause the communication interfaces to be connected (for example, one communication interface could be located at the top portion of the base module 110 for mating with a similarly positioned communication interface at the bottom portion of the user input module 120. As described below, the wiring preferably leads to a universal service module interface which is configured to mate or connect a service module, whereby base module 110 device may interface with those additional service modules.

In one embodiment, the modules are physically connectable to form a unitary station. As such, the base module 110 may include one or more connectors 116, which may be located on any surface of the base module 110 (such as the back, left, right, or top surface). Connectors 116 may include flanges, apertures, or any other type of connection/sealing mechanism configured to secure (physically connect/join) a secondary module to the base module 110, such as via a secondary connector associated with the secondary module (which might comprise an opening through which a fastener associated with the base module may extend, a nut for engaging a threaded fastener or other secondary connecting feature). Preferably, a plurality of apertures and slots are defined in the components of the base module 110, including the flanges thereof. In addition, a variety of studs may be connected to the various components and extend therefrom for use in connecting the components.

In one embodiment, one or more threaded fasteners may be passed through a wall or other portion of the housing 111 of the base module 110 into engagement with a secondary module. In a preferred embodiment, the threaded fastener(s) may extend from the interior of the housing 111 of the base module 110 into selective engagement with a secondary module. In this manner, when the housings are joined, the fasteners are no longer accessible, preventing the attached modules from being separated or removed by a party who does not have access to the interior of the housings thereof.

In one embodiment, the housing 111 may be provided with another or different locking mechanism. For example, the housing 111 may be configured to connect to a secondary module using an external lock or connection, such as may be spring-loaded and released. Such a connection may ensure that the housing 111 remains in position and the connectors 116 remain tightly engaged with other service modules. Preferably, when modules are connected, they are located adjacent to one another, and more preferably, are physically coupled and touching one another—such as by having a side (or top/bottom) of a housing of one module located against a side (or top/bottom) of a housing of another module.

In one embodiment, the one or more communication interfaces 114 may be located on or next to the one or more module connectors 116.

One or more sides of the housing 111 of the base module 110 may include slots 118, which may be covered by removable strips when not in use, such that the surface of the base module 110 may be smooth. Upon removing the cover strips, these slots 118 may be used to mount secondary modules (discussed below) directly onto the base module 110. In one embodiment, the communication interfaces 114 may be located on the inside of the base module 110, such as behind the slots.

The base module 110 may include a controller, which may be a computer-type configuration including a CPU. In such a configuration, the controller may comprise a motherboard having an associated memory and processor, among other components. In a preferred embodiment where the base module 110 is configured to facilitate basic casino financial services functionality or processing, the base module 110 includes a currency dispensing device. The currency dispensing device and secondary modules which are connected to the base module 110 may be configured to communicate with the processor via wired or wireless connection to a bus associated with the motherboard. The CPU may be powered by a power supply which obtains power from an outside source. Preferably, the various components of the controller are in communication with one or more communication interfaces 114.

Preferably, the controller may be configured to generate and/or provide service data, which may include data or information which is presented to a user via a display (which, as detailed below, may be part of another service module, or comprise a connected peripheral user device). The data may also include control instructions or commands for operating various components of the base module 110 or secondary modules associated with the base module 110. Peripherals of the base module 110 or components of associated secondary modules may be configured to communicate with the processor of the base module 110 via a bus associated with the motherboard. The CPU may be powered by a power supply which obtains power from an outside source.

In another embodiment, the controller of the base module 110 may be configured as a computer-type configuration including a CPU and input/output controller. The CPU may include a motherboard with embedded or associated processor, memory the like. Various inputs and outputs may be routed through an input/output board or controller. The components of the base module 110 may be provided in communication with one or more communication interfaces 114.

As indicated below, the modular service station may simply comprise the base module 110. For example, in an embodiment where the base module 110 is configured to implement currency dispensing functionality, the base module 110 might be used to provide that sole functionality, such as at a casino cashier station (as described below, in such an embodiment, a work station or peripherals such as a keyboard and display may be placed into communication with the base module 110, such as by the communication interfaces 114, to facilitate user input/communication with the base module 110). In such a configuration, the base module 110 may comprise a currency dispensing device which is located in the housing 111. Such a dispenser may comprise one or more mechanisms for moving currency from one or more currency boxes or cassettes (such as may be refilled or replaced) for delivery to the outlet 112, whereby a processed request for currency may result in the delivery of cash/currency (or a monetary value ticket or the like) to a casino attendant or a patron.

Most importantly, however, the modular service station may comprise the base module 110 and one or more associated secondary modules. The number and type of secondary modules which are associated with the base module 110 may vary, thus causing the end configuration of the modular service station to enable a variety of different functions.

As indicated above and still referring to FIG. 1, in one embodiment a secondary module may comprise a user input module 120. The user input module 120 may again comprise a housing 121 which is configured to house and/or support various components of the module. Those components may include one or more communication interfaces like the communication interfaces 114 (described above) on the base module 110, which may be used to attach the user input module 120 electronically to the base module 110. The user input module 120 may also include connectors like the connectors 116 (described above) on the base module 110, which may be used to attach the user input module 120 physically to the base module 110. The attached user input module 120 may permit a user to operate the base module 110. So combined, the modules 110, 120 may create a modular service station which operates like a kiosk or ATM to provide self-service (or as described below, partially attended service) currency dispensing to casino attendants or patrons/players.

The user input module 120 may include one or more output devices such as a display device 122, a speaker, a headphone jack, or any other type of output devices configured to output information to a user, and one or more input devices such as a keyboard 124, a microphone, a camera, or any other type of input devices configured to receive input from a user.

The user input module 120 may include a controller, which may be a computer-type configuration including a CPU. In such a configuration, the controller may comprise a motherboard having an associated memory and processor, among other components. The one or more input and output devices and the base module 110 to which the user input module 120 may be attached to may be configured to communicate with the processor via wired or wireless connection to a bus associated with the motherboard. The CPU may be powered by a power supply which obtains power from an outside source, or may be configured to be powered by the base module 110. Preferably, the various components of the controller are in communication with the communication interface connecting the user input module 120 and the base module 110.

As illustrated, the user input module 120 is configured to be mounted or connected to the base module 110. For example, the user input module 120 may be configured as a "topper" to the base module 110, such as by being shaped and sized to fit onto the top of the base module 110 and extend upwardly therefrom. This configuration has the advantage that the user input module 120 is located in a raised position for use by a user in a standing position. In other embodiments, however, the user input module 120 could be configured to be mounted to a side of the base module 110, such as by comprising a housing 121 which is as tall or taller than the base module 110.

Another example of a secondary module is a storage module 130. The storage module 130 may again comprise a housing 131 which is configured to house and/or support various components thereof. The storage module 130 may include communication interfaces like the communication interfaces 114 (described above) on the base module 110, which may be used to attach the storage module 130 electronically to the base module 110. The storage module 130 may also include connectors like the connectors 116

(described above) on the base module 110, which may be used to attach the storage module 130 physically to the base module 110.

In one embodiment, the storage module 130 might define a controlled interior space, such as for storing items therein. The storage module 130 may include a door 132 on its housing 131, which may permit access to the interior of the storage module 130 and/or the attached base module 110 without detaching the two modules 110, 130. This access may be secured with a lock 134 on the door 132.

In one embodiment, the storage module 130 may be configured to be connected to the base module 110, such as at a side thereof, or might be connected to another secondary module which is connected to the base module 110.

The storage module 130 may provide additional storage to the base module 110, which may be used to store items to be dispensed from the currency dispenser outlet 112 on the base module 110, or items used in connection with other modules, or other items (such as casino attendant person items, etc.).

In one embodiment, one side of the housing 131 of the storage module 130 and one side on the housing 111 of the base module 110 may be partially or fully detached, such that the two sides may connect to each other to combine the two housing create shared space between the storage module 130 and the base module 110.

In one embodiment, the storage module 130 may include additional communication interfaces 114, connectors 116, and/or slots 118, to enable additional service modules to be connected to the base module 110 via the storage module 130.

In some embodiments, the storage module 130 may include a controller, which may be a computer-type configuration including a CPU. In such a configuration, the controller may comprise a motherboard having an associated memory and processor, among other components. The additional secondary modules mounted on the storage module 130 may be configured to communicate with the processor via wired or wireless connection to a bus associated with the motherboard. The CPU may be powered by a power supply which obtains power from an outside source, or may be configured to be powered by the base module 110. Preferably, the various components of the controller are in communication with the communication interface connecting the storage module 130 and the base module 110. In one embodiment, modules mounted on the storage module 130 may communicate directly with the base module 110 via its communication interfaces 114. Further, as described, in one embodiment, the base module 110 may include a power supply which provides power to components thereof, but which also provides power to elements of the secondary module(s), such as by one or more power cables.

Yet another example of a secondary module is a currency recycling module 140. The currency recycling module 140 may also comprise a housing 141, such as for containing and/or supporting various components thereof.

The currency recycling module 140 may include communication interfaces like the communication interfaces 114 (described above) on the base module 110, which may be used to attach the currency recycling module 140 electronically to the base module 110. The currency recycling module 140 may also include connectors like the connectors 116 (described above) on the base module 110, which may be used to attach the currency recycling module 140 physically to the base module 110. The attached currency recycling module 140 may include a currency accepting slot 142, which may be configured to accept any type of currency (including but not limited to bills, coins, or tickets, tokens, or any other type of item representing a monetary value). The currency recycling module 140 may further include at least one currency processing device stored inside housing 141 of the module 140. The currency processing device may be configured to receive, identify and store currency. In some embodiments, the currency dispensing device may be configured to dispense currency, such as from the currency received thereby.

The currency recycling module 140 may include a controller, which may be a computer-type configuration including a CPU. In such a configuration, the controller may comprise a motherboard having an associated memory and processor, among other components. The currency acceptor 142 and/or the currency processing device may communicate with the processor via wired or wireless connection to a bus associated with the motherboard, such that the controller may determine the amount of currency received. The controller may also be configured to transmit the amount to other modules (such as the base module 110) for further processing. The CPU may be powered by a power supply which obtains power from an outside source, or may be configured to be powered by the base module 110. Preferably, the various components of the controller are in communication with the communication interface connecting the top box 120 and the base module 110.

Again, the currency recycling module 140 may be configured to be mounted or connected to the base module 110, such as to a side of the housing 111 thereof. Preferably, the currency recycling module 140 might be mounted or connected to another secondary module, such as which is connected to the base module 110.

Of course, various configurations of secondary modules might be provided. For example, another secondary modules might comprise a player tracking modules configured to provide or implement player tracking services (such as registering and logging into player tracking accounts with a casino to view and redeem awards and the like, such as where that module includes at least one controller which may communicate with a player loyalty system or server of the casino, include a display and one or more user input devices), to dispense player tracking or loyalty program cards (such as via a card printer or dispenser), to process and/or issue lines of credit (such as markers), a reader or scanner module configured to read, scan, validate, and/or authenticate barcodes, RFID codes, magnetic strips on any type of cards, RFID chips, and/or identification documents, a cashless wallet module configured to provide players cashless transaction services, and a variety of retail modules configured to integrate gaming services with retail services at the casinos. Other modules might provide other storage or support functions, such as work surfaces or the like. Other modules might provide docking or charging functionality, such as for docking or charging attendant equipment such as tablets or laptop computers. These secondary modules might be configure similar to those described above, such as comprising a self-supporting housing that can then be connected to another secondary module or the base module 110, or by comprising a smaller service module that may be mounted to and supported by the base module 110, such as mounting to the slots 118 on the base module 110.

In one embodiment, secondary modules may include various peripheral devices and may implement various software applications to as to implement a variety of services or functionality. In some embodiments, the modules might communicate with other devices, such as user devices comprising mobile phones, tablets, personal computers, etc.

(which may, in turn, communicate with the base module 110 via wired or wireless communication, such as between the modules).

FIG. 1 also illustrates an exemplary method of associating one or more secondary modules 120, 130, 140 with the base module 120. As illustrated therein, the top side of the base module 110 may be connected to the bottom of the user input module 120, the left side of the base module 110 may be connected to the right side of the storage module 130, and the right side of the base module 110 may be connected to the left side of the currency recycling module 140. Preferably, flat edge portions of the modules are mated with the outwardly extending flanges of mating components, whereby portions of the modules overlap one another to form points of connection.

In one embodiment, fasteners engage the base module 110. In one embodiment, somewhat elongate slots are formed in the edges of the modules (or flanges thereof) between opposing edges, while close tolerance holes are formed at the terminus of the edges. In this manner, when two modules are aligned for connection, the peripheral portions of each module are closely aligned, while the central portions thereof have slots which permit some offset while still accepting a fastener there through.

In some instances, studs extending from one module may extend through the mating slots/holes in the mating module. In other instances, bolts and mating nuts (or other threaded fasteners) are utilized. Importantly, in this configuration, "metal to metal" contact between the modules is ensured. For example, compared to riveting, where the rivet may "float" in an opening and not make constant and direct contact with the associated panel, the use of the studs or bolts and mating nuts ensures that metal to metal contact is guaranteed between the modules.

In a preferred embodiment, threaded studs or bolts and mating nuts are utilized to form the connections between the modules. In this manner, the modules may be shipped to an end user who can then attach the modules using only basic tools (i.e. without the need for special tools or special manufacturing equipment). It will additionally be appreciated that use of such fasteners, as compared to rivets, welding and the like, permits the assembled modules to be selectively disassembled. For example, a damaged module may be replaced by disconnecting it from the remaining modules. Another advantage of this configuration is, unlike rivets, that no part of the fasteners needs to be visible or accessible from the exterior of the modules (when studs are used, their heads are embedded, and when bolts or screws are used, they may pass through a flange rather than from the outer to the inner side of one the panel/module). This ensures that the fasteners are not tampered with and makes the modules more aesthetically pleasing.

In a preferred embodiment, the base module 110 comprises part of a universal interface which is configured to accept additional service modules to provide additional services. In one embodiment, a universal power distribution box, one or more connector panels, power supply, communication interfaces, and connectors on additional service modules may be connected to the base module 110.

In a preferred embodiment, the various electrically operated modules are arranged to be "stand-alone" so that they may be independently tested. For example, the keyboard 124 is configured so it may be directly tested in place on the user input module 120 while the user input module 120 is still detached and/or disconnected from base module 110. This configuration has the particular advantage that the modules can be tested before they are shipped and without having to connect to the base module 110, thus saving substantial time but still ensuring that the modules will work once attached to the base module 110.

Preferably, the configuration of the electrical components is substantially the same or "standardized" relative to each service module. For example, wiring harnesses are preferably same length, regardless of the size of the modules. Preferably, the wiring harnesses are all the longest length necessary for the largest module size. When used in smaller service modules, the wiring may be doubled back or folded to fit the slots 118. In this manner, only one configuration of each of the modules, including wiring sets or harnesses, needs to be configured for multiple configurations of the base module 110 and its attached modules. Further, the housings of various of the modules may be the same, allowing the individual modules to themselves be customized from a single base housing configuration. In such a configuration, the housings of one or more of the modules may be generally the same size, so that when joined, the combined station has a generally uniform dimensions.

As indicated, in a preferred embodiment, the base module 110 comprises communication interfaces 114 configured to accept additional service modules. The communication interfaces 114 may comprise one or more standardized connection or mount for a docking or mating with different modules.

It will be appreciated that each service module, including the base module 110, may have a variety of configurations. In addition, various of the aspects of the invention may be applied to service modules other than those described specifically herein.

In one embodiment, the base module 110 (and other service modules such as the storage module 130 and the currency recycling module 140) is configured as an "upright" cabinet (such as being self-support or standing). The base module cabinet could have other configurations, such as a table-top or counter console or the like. It will thus be appreciated that the service modules may have a variety of shapes and sizes. In general, however, the housings of the modules are configured to be complimentary, such as to be connected to one another. The generally planar sides of the housings of the base module 110 and secondary modules 120,130,140 illustrated in FIG. 1 are well-suited to such mating, but the housings might have other mating shapes.

Further, in a preferred embodiment, the secondary modules and the base module may be arranged in a variety of configurations. For example, preferably the secondary modules may be connected to either side of the base module or either side of another secondary module, thus enabling the module service station to have various configurations, including different configurations of the same set of modules. For example, two or more secondary modules might be mounted to the right side of the base module, or the same secondary modules might be mounted to the left side of the base module.

As described above, in one embodiment, the modular service station comprises a base module. In a preferred embodiment, the base module is configured to implement currency dispensing functionality. However, in other embodiments, the base module might be configured to implement other or additional functionality. For example, the base module might be configured to implement currency recycling functionality.

In one embodiment, the base module may be configured to act as a host to the modular service station, where the secondary modules act as slaves. For example, the secondary modules might connect to the base station, such as in the form of peripherals. In such a configuration, the secondary modules may be controlled via the base station. As one example, the modular service station might comprise a base module which implements currency dispensing functionality and a secondary module might implement player loyalty club card dispensing functionality. A player might use a user input module 120 to interface with the controller of the base module. The player might request a player loyalty card and the controller of the base module may send one or more commands or instructions to the secondary module to cause it to dispense the player loyalty card.

In another embodiment, the base module need not act as a host to the modular service station. In one embodiment, each module may be configured so that the module can operate individually, but can also be connected to one or more other modules. For example, instead of the currency recycler module 140 having to be associated to the base module 110, the currency recycler module 140 might be configured so that it can operate independently therefrom, such as in the form of a stand-alone currency recycling device.

It will also be appreciated that in some embodiments, a module might be connected to another device, such as an external computer or workstation so as to be "driven" thereby, or to simply extend the functionality of the computer or workstation. In such a configuration, the module need not include sufficient functionality to be operated in a stand-alone fashion. For example, as described below, one or more currency recycler modules 140 might be configured to be connected to a cashier workstation. The cashier workstation is thus provided with the additional functionality of currency recycling. In such a configuration, the cashier workstation may essentially drive the recycler. For example, the processor of the cashier workstation may be used to generate dispensing commands or the like which are received by the recycler module, causing the recycler module to dispense cash. In such a configuration, an external workstation or the like might be connected to one module or more than one module.

In one embodiment, the modular service station might include more than one module of a particular type or configuration. For example, a modular service station might include more than one currency dispensing module or the like (such as associated with a single base module).

In one embodiment, the modules might include other modular features. For example, the modules might be configured to accept various aesthetic elements, such as facades, trim or overlays, or other features such as signage, lighting elements, or the like. Such elements might, for example, be selectively associated with one or more modules, such as to make them more aesthetically pleasing. In one embodiment, these other elements may be selectively coupled to one or more modules.

Figure 2:
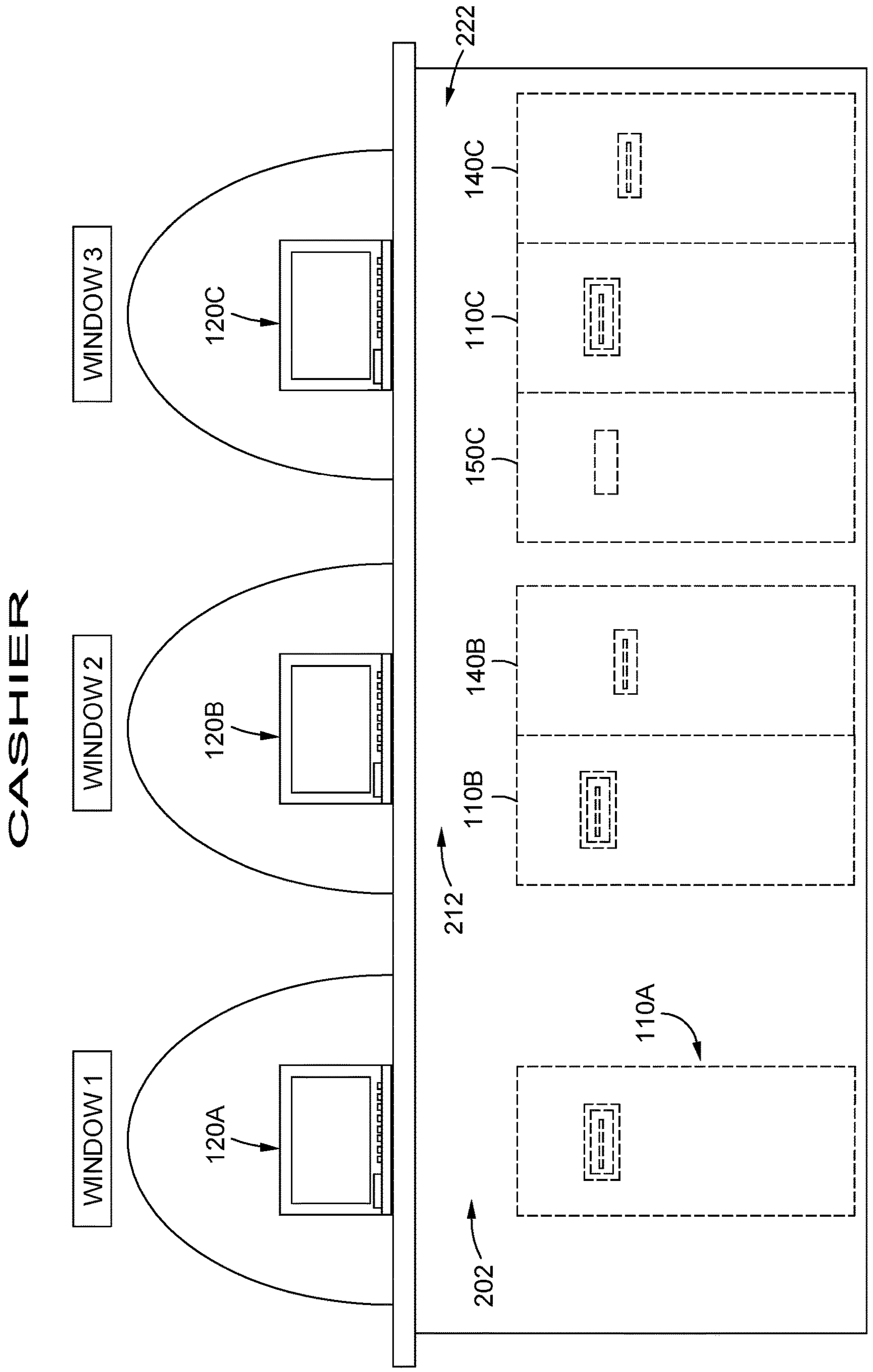
FIG. 2 illustrates an exemplary environment of use of different configurations of modular service station at a casino cashier's cage or service desk.

FIG. 2 illustrates an exemplary environment of use of a modular service station of the invention at a casino cashier's cage or service desk. In FIG. 2, a cashier's cage or service desk may include multiple windows or counters where casino staff or attendants may assist casino patrons or players in a variety of services and transactions.

A first window 1 may provide a service station 202 with a basic module 110A and a user input module 120A (which in this instance may or may not be physically connected to the base module 110A). Such a station 202 might allow a customer to access currency, such as similar to a kiosk or ATM, where the currency may be dispensed out of the dispenser to the patron.

A second window 2 may provide a service station 212 including a base module 110B, a user input module 120B and a currency recycling module 140B. This configuration service station 212 may thus allow patrons to both deposit currency and also receive currency (such as to an account, to pay off a marker, etc.)

A third window 3 may provide a service station 222 including a base module 110C, a user input module 120C, a currency recycling module 140C and a player loyalty club card dispensing module 150C.

In one embodiment, these stations 202, 212, 222 may be self-service, such as by allowing a patron or player to directly utility them to perform transactions. In other embodiments, as described, the stations might be "partially attendant" in the sense that an attendant may aid patrons in using the stations. Further, casino attendants may interact with the stations, such as to direct engage in transactions (for example, a patron might use the first station 202 to access cash, such as for wagering, while a casino attendant might use the first station 202 to process a jackpot and retrieve funds to pay the player's jackpot).

As illustrated in FIG. 2, one advantage of using different modular service stations at a cashier's cage or other service area is training. Service stations with more basic services may require less training and may be operated directly by patrons or by entry-level casino staff or attendants. Over time this entry-level attendant may acquire additional skills to operate additional service modules. Rather than having to learn to operate all service modules at once, casinos may provide a shorter and smoother training process for its entry-level attendants.

Another advantage of using different modular service stations at a cashier's cage or service desk is customization and optimization. For example, a casino may determine 80% of its services provided to patrons are cash withdrawals, but 20% of its services involve other transactions such as cash deposit and player tracking. Thus, while the casino may purchase 10 service stations, where 8 service stations include only a standalone basic module, whereas two other service stations include the currency recycling module and the player tracking module. The casino may, at a later point, find an increase in demand for player tracking, and may purchase and attach player tracking modules to 3 of its 8 standalone basic modules. Thus, allowing casinos to customize the service modules on their service stations may also save the casinos the additional expense of having to purchase 10 service stations each comprising all three modules instead.

Furthermore, because each service module may be detached and may operate independently from other modules, when one service module requires repair or maintenance, that service module may be detached and repaired/maintained separately, while allowing the remaining service modules to continue to serve patrons or players.

Figure 3:
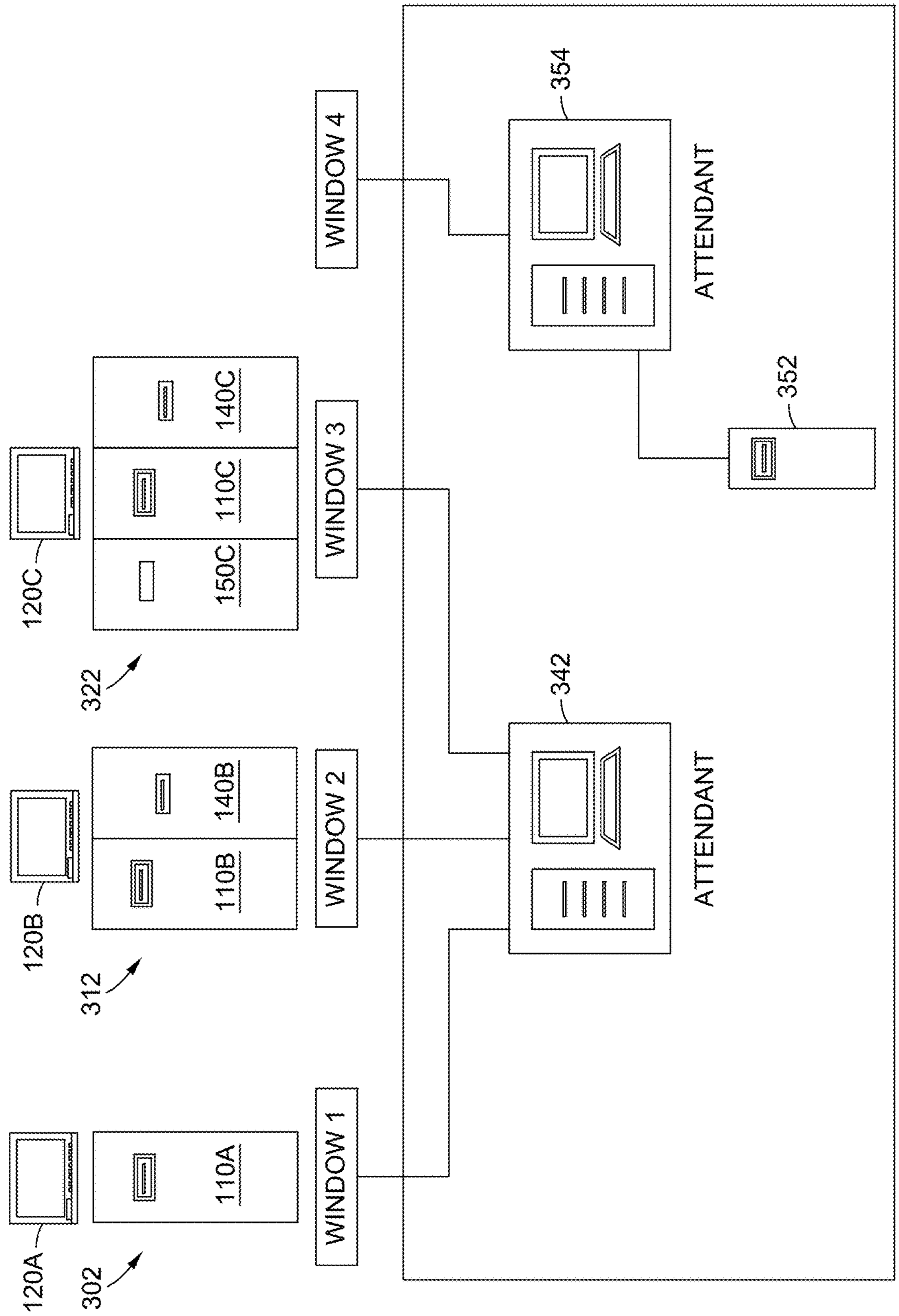
FIG. 3 illustrates a system comprising an exemplary environment of use of one or more modular service stations in a casino service area.

FIG. 3 illustrates another exemplary environment of use of a modular service station comprising a service area. The service area might comprise a casino cage or other location. FIG. 3 illustrates a configuration in which a casino cage has a plurality of windows or the like. The windows may be configured with modular service stations 302, 312, 322, such as similar to that described with reference to FIG. 2 (such as where the first modular station 302 comprises a base module 110A and a secondary user input module 120A; the second modular station 312 comprises a base module 110B, a secondary user input module 120B and a currency recycler module 120C; and the third station 322 comprises a base module 110C, a secondary user input module 120C, a currency recycler module 140C and a player loyalty card dispenser module 150C). Of course, the number of windows or other locations, and thus the number of stations and the configurations of those stations may vary.

Casino patrons/players may be directed to either of the three stations depending on their service needs and may interact with the modular stations 302, 312, 322 via their respective user input modules 120A-C.

In one embodiment, an attendant may supervise the three stations 302, 312, 322, such as by interacting directly therewith (via the same user input modules 120A, 120B, 120C), or interacting via an attendant's own user input module, workstation, or user device 342, which may interface with the modular stations 302, 312, 322 via wired or wireless communication. In such a configuration, the modular stations 302, 312, 322 may be referred to as "partially attended" stations in the sense that the primary user may be a patron, but where an assistant may aid the patron in using the station. For example, the attend may address problems encountered by the patron, provide required authorizations for particular transactions and the like.

A separate service station may be provided for casino patrons/players who may do not wish to use the modular service stations, or if the stations do not support the functionality the patron desires. Depending on the casino's needs, one or more service modules 352 may be provided to an attendant. The attendant may interface with the one or more service modules 352 via a user input modules, workstation, or user device 354.

As illustrated in FIGS. 2 and 3, modular service stations may be unattended (such as directly used by a patron without assistance) or might be partially attended (e.g. where the station is designed to be operated by a patron with supervision or assistance of an attendant). As illustrated in FIG. 3, one advantage to such a configuration is that attendant assistance may be made available to a patron, but where a single attendant may provide assistance relative to multiple stations. This results in a lower number of attendants being required to provide services to patrons that if an attendant is provided at each window, as in the prior art.

As indicated above, in some embodiments, the modules or modular service stations might be driven by one or more workstations. For example, referring to FIG. 3, the attendant station 342 might be configured to drive or operate various of the modular service stations, such that they may not include a base module 110A. Further, in such a configuration, one workstation might drive or operate multiple modular service stations, or in other embodiments, a different workstation might operate each different modular service station.

In addition to the advantages discussed above, the modular service station of the invention has additional benefits. First, the service modules may be tested and shipped individually, in groups, in un-assembled form. This is a substantial advantage over shipping an assembled service station which is large/oversized, has a substantial volume of dead space, and may include unnecessary features. The modular configuration also permits the service station to be configured in a variety of manners.

Second, the service modules may be standardized, reducing the cost of manufacture. Typically, service stations are customized to individual casinos' needs and appearances. This substantially increases the cost of creating service stations. In accordance with the invention, a service station may be constructed from universal modules. These modules may be produced in mass. At the same time, various service station configurations may be achieved, and various services may be provided, from the universal modules, such as by attaching additional modules. This allows a variety of service stations having different features and appearances to be manufactured at low cost.

Third, the modular service stations may reduce the number of staff needed to service patrons. As illustrated in FIGS. 2 and 3, by combining self-service modules with modules requiring a casino staff or attendant, one casino staff or attendant may oversee a number of modular service stations.

Also, the modular stations may be used in a variety of environments, including at a casino cage or other locations. For example, a modular station might be associated with a cart so that it is mobile, or might be located at a free-standing location in the casino (such as away from the casino cage).

It will be understood that the arrangements of apparatus and the method described above are merely illustrative of applications of the principles of this invention. Many other embodiments and modifications may be made without departing from the spirit and scope of the invention as defined in the claims.

What is claimed is:

1. A modular casino service station comprising:

a base module, said base module comprising:

a housing;

a controller located in said housing;

at least one first connector associated with said housing; and a first communication interface, said first communication interface in communication with said controller; and a secondary module, said secondary module comprising:

a housing;

at least one second connector associated with said housing and configured to connect to said at least one first connector; and a second communication interface;

wherein said secondary module and said base module are selectively coupled by said at least one first connector and said at least one second connector so that said base module is adjacent to said secondary module, said second communication interface is communicatively coupled with said first communication interface;

wherein said housing of said base module and said housing of said secondary module are generally the same size and shape; and wherein each of said base module and said secondary module comprise at least one of a currency dispenser module, a player loyalty interface module, a currency recycler module, a user interface module and a storage module.

2. The modular casino service station in accordance with claim 1, wherein said base module comprises a currency dispenser module and comprises a currency dispenser located in said housing of said base module.

3. The modular casino service station in accordance with claim 2, wherein said secondary module comprises a currency recycler module and comprises a currency recycler located in said housing of said secondary module.

4. The modular casino service station in accordance with claim 1, wherein said base module further comprises a power module and a power connector of said secondary module is connected to said power module of said base station to provide power to said secondary module.

5. The modular casino service station in accordance with claim 1, wherein said housing of said base module has a top and a first side and an opposing second side and said secondary module is connected to said first side or said second side of said housing of said base module.

6. The modular casino service station in accordance with claim 5, wherein said base module comprises a currency dispensing module having a currency dispenser opening located at a front of said housing of said base module between said first and second sides and below said top.

7. The modular casino service station in accordance with claim 1, further comprising a third module, said third module comprising a housing which is connected to said housing of said base module or said secondary module, and which comprises a third communication interface which is in communication with a secondary communication interface of either said base module or said secondary module.

8. The modular casino service station in accordance with claim 1, wherein said controller of said base module is communicatively coupled to an attendant station comprising at least one processor, a memory, a video display and a user input device.

9. The modular casino service station in accordance with claim 1, wherein said secondary module further comprises a controller and when said first communication interface is coupled to said second communication interface, said controller of said secondary module is in communication with said controller of said base module.

10. A casino service station comprising:

a first modular casino service station comprising a first base module comprising a housing and at least one first casino service device located in said housing of said first base module and a first secondary module connected to said first base module, said first secondary module comprising a housing and at least one second casino service device located in said housing of said first secondary module, whereby said first modular casino service station is configured to implement first and second casino service functionalities by said at least one first casino service device and said at least one second casino service device; and a second modular casino service station comprising a second base module having at least one third casino service device, and a second secondary module connected to said second base module, said second secondary module comprising at least one fourth casino service device located in a housing of said second base module, whereby said second modular casino service station is configured to implement first and third casino service functionalities by said at least one third casino service device and said at least one fourth casino service device.

11. The casino service station in accordance with claim 10, wherein said first and second base modules each comprise a currency dispensing module and said at least one first casino service device and said at least one third casino service device each comprises a currency dispenser.

12. The casino service station in accordance with claim 10, wherein said at least one second casino service device and said at least one fourth casino service device are selected from the group consisting of: a user input device, a currency recycler, a card dispenser, and a card reader.

13. The casino service station in accordance with claim 10, where said first base module comprises a controller, said at least one second casino service device of said first secondary module is communicatively coupled to said controller of said first base module, said second base module comprises a controller, and said at least one fourth casino service device of said second secondary module is communicatively coupled to said controller of said second base module.

14. A modular casino service station comprising:

a base module, said base module comprising:

a housing;

a controller located in said housing;

at least one first connector associated with said housing; and a first communication interface, said first communication interface in communication with said controller; and a secondary module, said secondary module comprising:

a housing;

at least one second connector associated with said housing and configured to connect to said at least one first connector; and a second communication interface;

wherein said secondary module and said base module are selectively coupled by said at least one first connector and said at least one second connector so that said base module is adjacent to said secondary module, said second communication interface is communicatively coupled with said first communication interface;

wherein said housing of said base module comprises a plurality of selectively openable openings and said housing of said secondary module comprises one or more openings, at least one of said openings in said housing of said secondary module aligned with said one of said selectively openable openings of said base module; and wherein each of said base module and said secondary module comprise at least one of a currency dispenser module, a player loyalty interface module, a currency recycler module, a user interface module and a storage module.

15. The modular casino service station in accordance with claim 14, wherein said base module comprises a currency dispenser module and comprises a currency dispenser located in said housing of said base module.

16. The modular casino service station in accordance with claim 14, wherein said housing of said base module has an upstanding first side and an upstanding second side, said housing of said secondary module has a third side positioned adjacent to said first side of said housing of said base module wherein one or more of said selectively openable openings are located in said first side of said housing of said base module and said one or more openings in said housing of said secondary module located in said third side.

17. The modular casino service station in accordance with claim 16, further comprising a third module comprising a housing and a third connector, said housing of said third module having a fourth side positioned adjacent to said second side of said housing of said base module and said third connector connected to at least one of said at least one first connector of said base module.

* * * * *